(12) United States Patent
Nago

(10) Patent No.: US 6,471,457 B2
(45) Date of Patent: *Oct. 29, 2002

(54) SCREW RETENTION DEVICE HAVING A HOOK

(75) Inventor: Daisuke Nago, Osaka (JP)

(73) Assignee: Shimano, Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/792,432

(22) Filed: Feb. 23, 2001

(65) Prior Publication Data

US 2002/0119027 A1 Aug. 29, 2002

(51) Int. Cl.[7] ............................... F16B 39/10
(52) U.S. Cl. ...................... 411/121; 411/410
(58) Field of Search ........................... 411/119, 120, 411/121, 522, 523, 248, 87, 92, 93, 95, 97, 102, 402, 405, 408, 410; 81/13

(56) References Cited

U.S. PATENT DOCUMENTS

| | | | | |
|---|---|---|---|---|
| 539,692 | A | * | 5/1895 | Lister |
| 969,543 | A | * | 9/1910 | Lance |
| 1,026,812 | A | * | 5/1912 | Lance |
| 1,151,632 | A | * | 8/1915 | Wall |
| 1,367,985 | A | * | 2/1921 | Nainka |
| 1,871,684 | A | | 8/1932 | Gibbons |
| 2,370,944 | A | * | 3/1945 | Emerson |
| 2,880,637 | A | * | 4/1959 | Koenig |
| 2,955,690 | A | * | 10/1960 | Bedford |
| 3,031,049 | A | * | 4/1962 | Somville |
| 4,906,150 | A | * | 3/1990 | Bennett |
| 5,954,466 | A | * | 9/1999 | Coffey |

FOREIGN PATENT DOCUMENTS

| | | |
|---|---|---|
| FR | 93 14026 | 11/1993 |
| GB | 339051 | 12/1930 |
| GB | 910446 | 1/1960 |

* cited by examiner

Primary Examiner—Flemming Saether
(74) Attorney, Agent, or Firm—Jeffer, Mangels, Butler & Marmaro LLP

(57) ABSTRACT

A screw retention device is disclosed having a clamping part and a hook part. The clamping part engages the head of a screw for securely retaining the screw. The hook part interacts with a surface of the component on which the screw is fastened to limit the rotation of the screw. The screw retention device is configured to be used with any known screw having a protruding head. In a preferred embodiment of the invention, the screw retention device is used with a serrated screw wherein the clamping part of the screw retention device includes a serrated portion which corresponds to and engages with the serrations on the serrated screw to securely grip the screw.

10 Claims, 3 Drawing Sheets

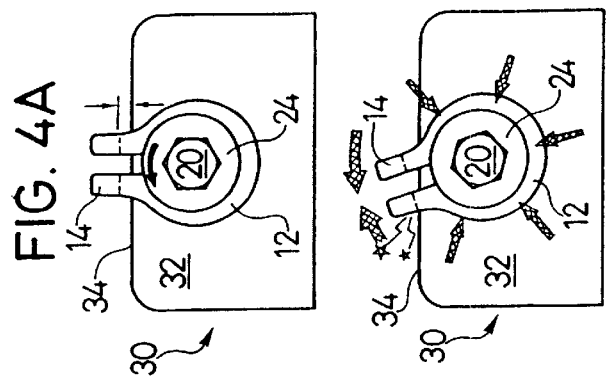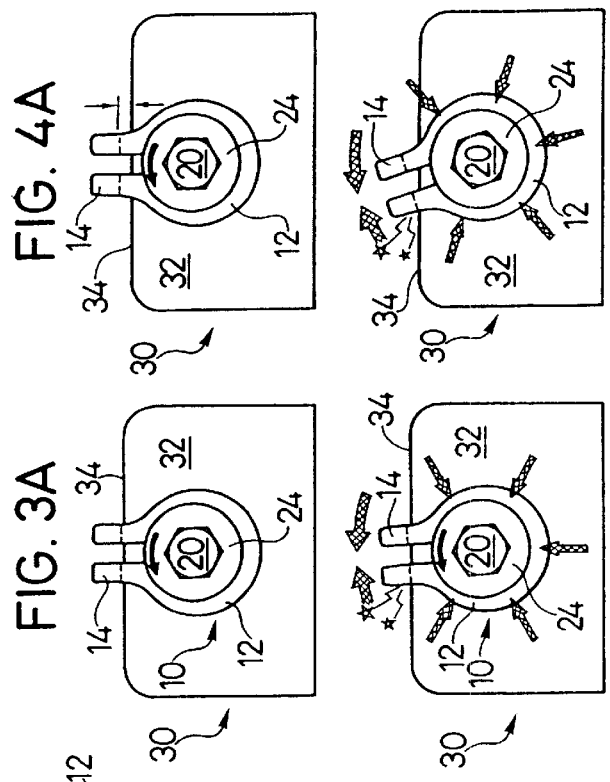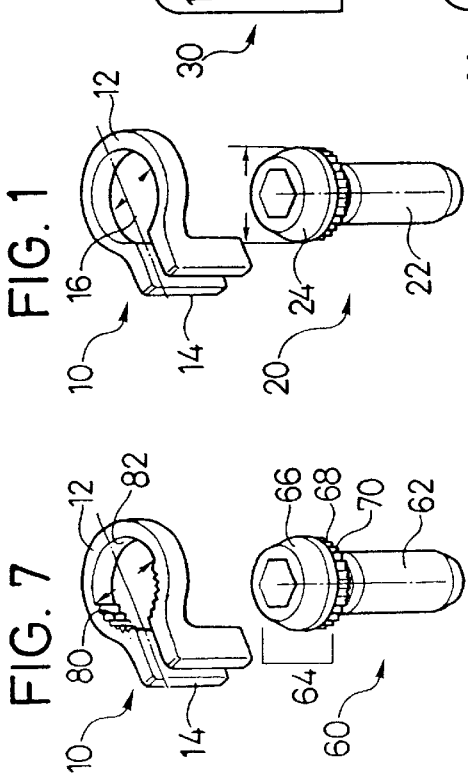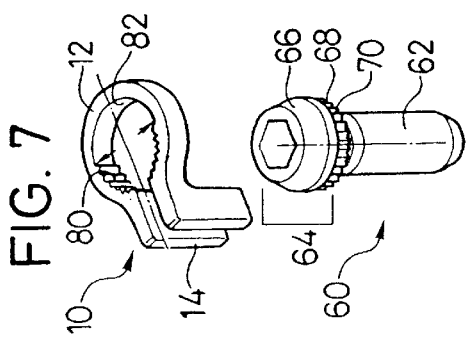

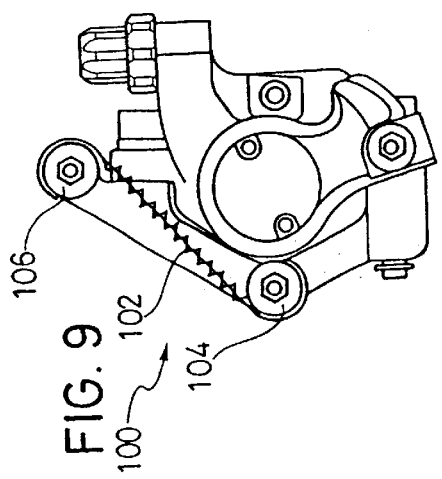
FIG. 9 PRIOR ART
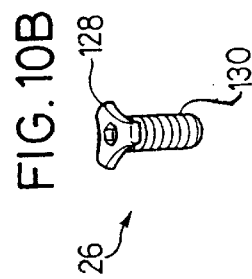
FIG. 10B
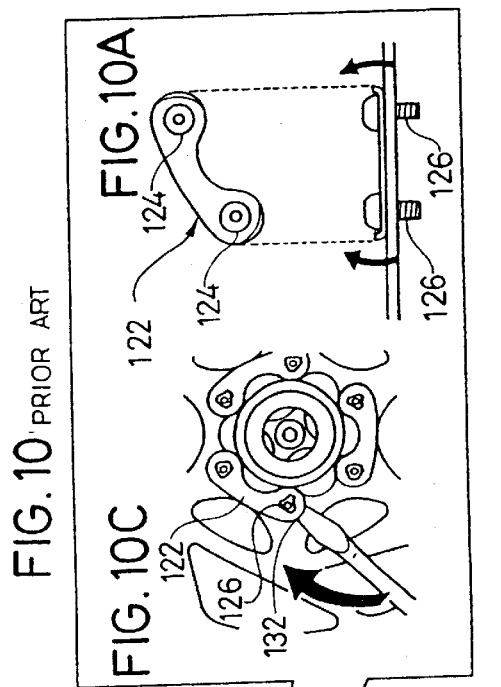
FIG. 10A PRIOR ART
FIG. 10C
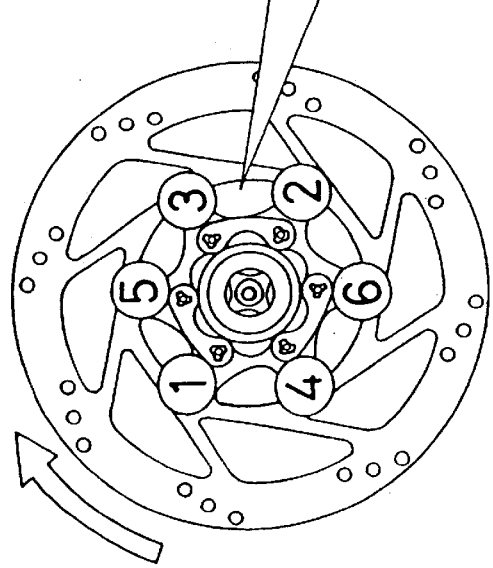
FIG. 10 PRIOR ART

SCREW RETENTION DEVICE HAVING A HOOK

FIELD OF THE INVENTION

The present invention relates generally to screw retention devices, and more particularly to a screw retention device having a clamping part for securely gripping a screw and a hook part for retaining the position of the screw.

BACKGROUND OF THE INVENTION

When using a fastener, such as a screw, there is a risk that vibrations, or other conditions, will cause the screw to shift in position, loosen and, in some cases, fall out. To prevent the screw from shifting or falling out, numerous screw retention devices and methods have been developed. As shown in FIG. 9, a known device 100 is disclosed for preventing fall out. The device 100 includes a wiring mechanism 102 that is used to wire a pair of tightened screw heads 104, 106 together.

Another known device 120 is shown in FIGS. 10A–10C. The known device 120 includes a tightening plate 122, best shown in FIG. 10A, having a pair of holes 124 dimensioned to receive screws 126. The screws 126, as best shown in FIG. 10B, have a triangular head portion 128 and a threaded shaft 130. To install the tightening plate 122, the screw shaft 130 is positioned through a hole 124 of the tightening plate 122 prior to being threadingly engaged with another object. As shown in FIG. 10C, each tightening plate 122 receives two screws 126. When the screws are fastened, the edge 132 of the tightening plate 122 is bent in the direction designated as X, shown in FIG. 10C, to fit the shape of the screw. When the edges 132 are bent around the screw 126, the bent edges prevent the triangular head 128 from rotating. Thus, the screw 126 is maintained in position.

The known methods of retaining screws in a static position are complicated and time consuming. Accordingly, there is a need for a simplified method and device to retain screws in a static position.

SUMMARY OF THE PREFERRED EMBODIMENTS

A screw retention device is disclosed having a clamping part and a hook part. The clamping part engages the head of a screw for securely retaining the screw. The hook part interacts with a surface of the component on which the screw is fastened to limit the rotation of the screw. The screw retention device is configured to be used with any known screw having a protruding head. In a preferred embodiment of the invention, the screw retention device is used with a serrated screw wherein the clamping part of the screw retention device includes a serrated portion which corresponds to and engages with the serrations on the serrated screw to securely grip the screw.

The serrated screw preferably includes an upper head portion and a lower head portion, wherein the upper head portion has a larger diameter than the lower head portion and wherein the lower head portion carries the serrations. When the screw retention device is installed on the serrated screw, the serrated surface of the clamping part engages the serrations on the lower head portion of the screw. The upper head portion limits the movement of the screw retention device in an upward direction.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 1 is a perspective view of a preferred embodiment of the screw retention device of the present invention and a preferred embodiment of a screw used in conjunction with the screw retention device;

FIG. 2 is a perspective view of a preferred embodiment of the screw retention device and screw of FIG. 1, as installed on a component;

FIG. 3A is a top plan view of the screw retention device of the present invention wherein the clamping part of the screw retention device engages a screw and the hook part extends along a surface of the component;

FIG. 3B is a top plan view of the screw retention device of FIG. 3A wherein the hook part contacts the side surface of the component thereby limiting the rotation of the screw;

FIG. 4A is a top plan view of the screw retention device of the present invention installed on the component such that there exists a gap between the hook part of the screw retention device and the side surface of the component;

FIG. 4B is a top plan view of the screw retention device of FIG. 4A wherein, upon the rotation of the screw, the hook part contacts the side surface of the component thereby limiting the rotation of the screw;

FIG. 7 is a preferred embodiment of the screw retention device of the present invention having a serrated surface for gripping a serrated screw;

FIG. 9 is a known screw retention device that tightens about the screw heads; and FIGS. 10a through 10c depict a known tightening plate, shown separately and as installed in connection with a plurality of screws.

Like numerals refer to like parts throughout the several views of the drawings.

DETAILED DESCRIPTION OF THE PREFERRED EMBODIMENTS

Figure 5:
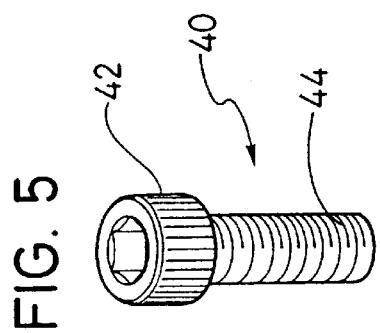
FIG. 5 depicts a perspective view of a conventional cap screw which can be used with the screw retention device of the present invention.

A preferred embodiment of the screw retention device of the present invention is shown in FIG. 1 and designated as numeral 10. Screw retention device 10 has a clamping part 12 and a hook part 14. In a preferred embodiment of the invention, the hook part 14 lies in a plane that is substantially normal to the plane of the clamping part 12. The clamping part 12 of the screw retention device 10 defines a recess 16 therein. Recess 16 is preferably dimensioned to receive a screw 20 and securely retain the screw 20 in the recess 16.

The screw retention device 10 is configured to be used in conjunction with known screws, as well as a specialized screw which will be described in more detail below. As shown in FIG. 1, generally, the screw 20 includes a shaft 22 and a head 24. In a preferred embodiment of the invention, the inner diameter 18 of the clamping part 12 of the screw retention device 10 is smaller than the outer diameter 26 of the head 24 of the screw 20. The retention device 10 is preferably made of a resilient material so that the clamping part 12 fits tightly onto the screw head 24. In a more preferred embodiment of the invention, the retention device 10 is made of resilient plastic. In another embodiment of the invention, the screw retention device 10 comprises a resilient metal and more preferably, the screw retention device comprises spring steel.

A preferred embodiment of a screw retention device 10 as installed on a screw 20 is shown in FIG. 2. In the embodiment shown in FIG. 2, screw 20 is first fastened to a component 30. Component 30 includes a top surface 32 and a side surface 34. The top surface 32 preferably connects to the side surface 34 perpendicularly. The screw 20 is fastened to the top surface 32 of the component 30. After tightening the screw 20 onto the component 30, the retention device 10 is snap fit around the head 24 of the screw 20. When installed, the clamping part 12 of the screw retention device 10 securely fits around the head 24 of the screw, while the hook part 14 of the screw retention device preferably extends along the side surface 34 of the component 30. The hook part 14 of the screw retention device 10 preferably contacts the side surface 34 of the component 30.

There are various situations in which forces on screw 20 urge the screw toward a counterclockwise, or loosened, position. For example, if the top surface 32 of the component 30 is painted, the axial binding force of the screw is weakened by the deformation of the surface 32, resulting in a loosening of the screw. However, if the screw retention device 10 is installed on the screw 20, the rotation of the screw is stopped and the screw is prevented from loosening and thus separating from the component 30.

The operation of the screw retention device 10 to prevent the rotation of the screw 20 is shown in FIGS. 3A and 3B. As shown in FIG. 3A, when installed, the clamp part 12 of the screw retention device 10 securely holds the head 24 of the screw 20. The hook part 14 of the screw retention device 10 extends along the side surface 34 of the component 30, and preferably is in contact with the side surface 34. When the screw 20 is rotated in a counterclockwise direction, as shown in FIG. 3B, the hook part 14 of the screw retention device 10 contacts the side surface 34 and prevents the rotation of the screw. Accordingly, the position of the screw is maintained.

Additionally, because of the configuration of the screw retention device 10, the force with which the clamping part 12 secures the screw head 24 increases when the screw 20 is rotated in a counterclockwise direction. The force or moment generated by the counterclockwise rotation of the screw head 24 is transmitted to the retention device 10. Since the hook part 14 is resting on the side surface 34 of the component 30, the force is transformed into the force that presses the inside wall of the clamping part 12 against the outer peripheral surface of the screw head 24. Accordingly, as the screw 20 is rotated in a counterclockwise direction, the force exerted by the clamping part 12 on the screw head 24 increases causing the screw to be tightly retained.

An alternative embodiment of the invention is shown in FIGS. 4A and 4B wherein the screw retention device 10 is installed on the screw head 24 such that the hook part 14 of the screw retention device 10 does not contact the side surface 34, when the screw is in a tightened position. As shown in FIG. 4A, the hook part 14 is spaced apart from the side surface 34, leaving a gap 36 between the hook part 14 and the side surface 34. When the screw 20 is rotated in a counterclockwise direction, as shown in FIG. 4B, the screw is permitted to rotate partially before the hook part 14 of the screw retention device 10 contacts the side surface 34 and prevents the screw 20 from further rotation. In this embodiment, the screw 20 rotates a partial rotation. However, the screw retention device 10 prevents the screw 20 from completing a full rotation. Thus, although the embodiment shown in FIGS. 4A and 4B do not restrict the movement of the screw as much as the embodiment of FIGS. 3A and 3B, the screw 20 is nevertheless prevented from loosening a full rotation and accordingly, prevented from disengaging from the component 30.

In the embodiments shown in FIGS. 2 through 4, the hook part 14 of the screw retention device 10 is shown overhanging the edge of the component 30. However, the position of the screw retention device 10 is not limited to an edge of the component 30. Rather, the screw retention device 10 can be used with any protruding screw 20 wherein there is a channel dimensioned to receive the hook part of screw retention device proximal the protruding screw. For example, in one embodiment of the invention, a channel (not shown) can be provided in the top surface 32 of the component 30 to receive the hook part 14 of the screw retention device.

In a preferred embodiment of the invention, the hook part 14 of the screw retention device 10 includes a pair of arms 14a, 14b, positioned substantially parallel to each other defining a gap therebetween. To remove the screw retention device 10 from the screw, the arms 14a, 14b of the hook part 14 are pulled apart. By pulling the arms 14a, 14b apart, the diameter of the clamping part 12 is increased and the clamping part 12 is disengaged from the screw head 24. Upon disengagement of the screw retention device 10 from the screw head 24, the retention device 10 can be removed.

The screw retention device of the present invention can be used with any screw having a protruding head 24. By way of example, FIG. 5 depicts a conventional cap screw 40 having a screw head 42 and a shaft 44. The screw retention device 10 of the present invention can be used to retain a conventional cap screw 40 in a substantially static position.

Figure 6:
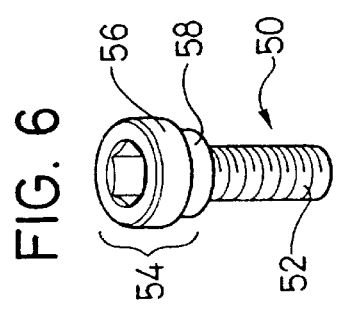
FIG. 6 is a perspective view of a screw which can be used with the screw retention device of the present invention.

FIG. 6 depicts another embodiment of the type of screw that could be used in conjunction with the screw retention device of the present invention. As shown in FIG. 6, screw 50 includes a shaft 52 and a head 54. The head is preferably further divided into an upper head portion 56 and a lower head portion 58. In a preferred embodiment of the invention, the diameter of the upper head portion 56 is greater than the diameter of the lower head portion 58. When the screw retention device 10 is installed on screw 60, the clamping part 12 of the screw retention device 10 engages the lower head portion 58 of the screw 60. To ensure a tight grip by the clamping part 12 of the screw retention device, the diameter of the lower head portion 58 is preferably slightly larger than the diameter 18 of the clamping part 12. Because the diameter of the upper head portion 56 is larger than the diameter of the lower head portion 58, the screw retention device 10 is further restricted in movement in an upward direction.

To facilitate the snap fit installation of the screw retention device 10, the upper head portion 56 is preferably tapered.

To install the screw retention device 10, recess 16 is aligned with the head 24 of the screw 20. The screw retention device 10 is pressed onto the screw head until the clamping part 12 of the device 10 engages the head 24 of the screw and securely holds the screw in a static position.

Figure 8:
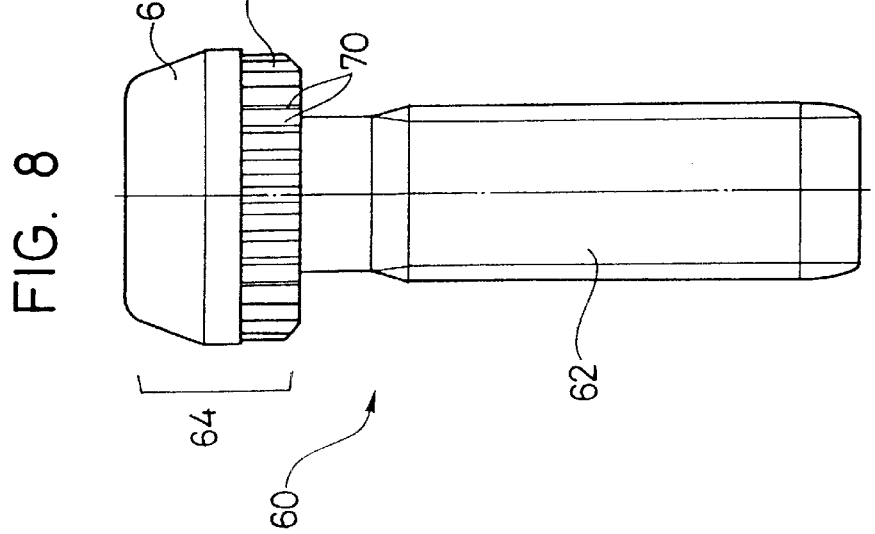
FIG. 8 is a preferred embodiment of a serrated screw that can be used in conjunction with the screw retention device of FIG. 7.

Another preferred embodiment of the invention, as shown in FIG. 7, includes a screw retention device 10 having a serrated surface that corresponds to a serrated screw 60. As shown in FIG. 8, the serrated screw 60 includes a shaft 62 and a head 64 having an upper head portion 66 and a lower head portion 68. In a preferred embodiment of the invention, the diameter of the upper head portion 66 is larger than the diameter of the lower head portion 68. The lower head portion 68 preferably includes serrations 70 which correspond to and engage with serrations 80 on the clamping part 12 of the screw retention device 101 as shown in FIG. 7 and described in more detail below.

The embodiment of the screw retention device 10 shown in FIG. 7 is configured to be used with a serrated screw 60, as shown in FIGS. 7 and 8. In a preferred embodiment of the invention, the screw retention device 10 includes a serrated surface 80 along the inside periphery of the clamping part 12. In one embodiment of the invention, the serrated surface 80 extends along the entire inside periphery of the clamping part 12. In a more preferred embodiment of the invention, the inside periphery of the clamping part 12 includes a serrated surface 80 and a non-serrated surface 82. The non-serrated surface 82 is provided to prevent the breakage of the retention device 10 during the installation by removing serrations that act as stress risers. In a preferred embodiment of the invention, the serrated surface is proximal the hook part 14 and the non-serrated section is distal the hook part 14.

To install the screw retention device 10 onto the screw 60, the retention device is pressed onto the head 64 of the screw 60 until the serrated surface 80 of the clamping part 12 engages the serrations 70 of the screw 60. To facilitate the press fitting of the retention device 10, the upper head portion 66 of the screw 60 is tapered or cone-shaped. The diameter of the lower head portion 68 is preferably slightly larger than the diameter 18 of clamping part 12 to ensure that the clamping part 12 retains a tight grip on the screw head 64. When the screw retention device is installed onto the screw 60, and the serrated surface 80 of the clamping part 12 engages the serrations 70 of the screw, the screw is tightly retained in place.

The embodiments described above are exemplary embodiments of a screw retention device having a hook part and a clamping part. Those skilled in the art may now make numerous uses of, and departures from, the above-described embodiments without departing from the inventive concepts disclosed herein. Accordingly, the present invention is to be defined solely by the scope of the following claims.

What is claimed is:

1. A screw retainer assembly, comprising:
   a screw having a screw head;
   a screw retention device snap fit onto the screw head, the screw retention device having a clamping part extending in a first plane and a hook part attached to the clamping part and extending in a second plane, the clamping part defining a recess dimensioned to receive the screw head, the clamping part having an inner circumference comprising a serrated surface proximal the hook part and a non-serrated surface distal the hook part,
   wherein the screw head includes an upper head portion and a lower head portion, and wherein a diameter of the upper head position is larger than a diameter of the lower head portion, and
   wherein the upper head portion further includes a top and a bottom, and is tapered to form a conical shape such that the top of the upper head portion has a smaller radius than the bottom of the upper head portion.

2. The screw retainer assembly of claim 1 wherein the lower head portion includes an outer circumference having a serrated surface.

3. The screw retainer assembly of claim 2 wherein the serrated surface of the screw retention device corresponds to and engages with the serrated surface of the lower head portion of the screw.

4. A screw retainer assembly for securely maintaining a screw in a static position, the screw retainer assembly comprising:
   a screw having a screw head, wherein the screw head comprises an upper head portion and a lower head portion, and wherein a diameter of the upper head portion is larger than a diameter of the lower head portion, and wherein the upper head portion further includes a top and a bottom, and is tapered to form a conical shape such that the top of the upper head portion has a smaller radius than the bottom of the upper head portion;
   a screw retention device snap fit onto the screw head, the screw retention device having a clamping part extending in a first plane and a hook part attached to the clamping part and extending in a second plane, the clamping part defining a recess having a diameter and an inner circumference, wherein the recess of the clamping part is dimensioned to receive the screw, and wherein the inner circumference of the clamping part comprises a serrated surface.

5. The screw retention device of claim 4 further comprising a resilient material.

6. The screw retention device of claim 5 further comprising resilient metal.

7. The screw retention device of claim 5 further comprising resilient plastic.

8. The screw retention device of claim 4 wherein the first plane is substantially perpendicular to the second plane.

9. A method of retaining a screw fastened in a component in a substantially static position, comprising the steps of:
   providing a screw having a head portion and a shaft;
   providing a component having a top surface and a side surface substantially normal to the top surface;
   providing a screw retention device having a clamping part extending in a first plane and a hook part attached to the clamping part and extending in a second plane, the clamping part defining a recess dim enjoined to receive the screw, the clamping part having an inner circumference comprising a serrated surface;
   fastening the screw into the top surface of the component;
   snap fitting the screw retention device on the screw, wherein the clamping part of the screw retention device grips the head portion of the screw and the hook part of the screw retention device extends along the side surface of the component,
   wherein the movement of the screw retention device is restricted in an axial direction by the screw head; and
   wherein upon rotation of the screw, the hook part of the screw retention device contacts the side surface of the component, thereby limiting the rotation of the screw.

10. The method of claim 9 wherein the head portion of the screw comprises a serrated surface and the serrated portion of the clamping part corresponds to and engages with the serrated surface of the screw.

* * * * *